United States Patent
Koga et al.

(10) Patent No.: US 6,924,940 B2
(45) Date of Patent: Aug. 2, 2005

(54) ZOOM LENS UNIT AND METHOD OF DRIVING THE SAME

(75) Inventors: Akihiro Koga, Kawasaki (JP); Mitsunobu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/672,409

(22) Filed: Sep. 29, 2003

(65) Prior Publication Data

US 2004/0130802 A1 Jul. 8, 2004

(30) Foreign Application Priority Data

Sep. 30, 2002 (JP) ........................................ 2002-287361

(51) Int. Cl.[7] ...................... G02B 15/14; G03B 17/00; G03B 13/34; H02N 1/00; H04N 5/225

(52) U.S. Cl. ...................... 359/694; 359/696; 359/823; 396/87; 396/133; 310/12; 310/309; 348/335; 348/374; 257/232

(58) Field of Search ................................ 359/694, 696, 359/697, 823; 310/12, 309; 348/335, 374, 303, 304; 396/133, 75, 87; 257/232, 233

(56) References Cited

U.S. PATENT DOCUMENTS

| | | | | |
|---|---|---|---|---|
| 5,323,199 A | * | 6/1994 | Yoshida | 396/87 |
| 6,265,736 B1 | * | 7/2001 | Dillen et al. | 257/232 |
| 6,531,804 B2 | * | 3/2003 | Kasahara | 310/309 |
| 6,611,079 B2 | | 8/2003 | Koga et al. | 310/309 |
| 6,670,738 B2 | * | 12/2003 | Kasahara et al. | 310/309 |
| 6,680,558 B2 | * | 1/2004 | Akiba et al. | 310/309 |
| 6,750,591 B2 | * | 6/2004 | Akiba et al. | 310/309 |
| 6,781,281 B2 | * | 8/2004 | Koga et al. | 310/309 |
| 6,784,594 B2 | * | 8/2004 | Kasahara et al. | 310/309 |
| 6,806,618 B2 | * | 10/2004 | Koga et al. | 310/309 |

OTHER PUBLICATIONS

A. Koga, et al., Journal of Lightwave Technology, vol. 17, No. 1, pp. 43–47, "Electrostatic Linear Microactuator Mechanism for Focusing a CCD Camera", Jan. 1999.

* cited by examiner

*Primary Examiner*—Loha Ben
(74) *Attorney, Agent, or Firm*—Oblon, Spivak, McClelland, Maier & Neustadt, P.C.

(57) ABSTRACT

A drive control circuit executes a cycle at least once while a first movable part moves one pitch of an electrode of a plurality of groups of electrodes, the cycle including a first operation for attracting the first movable part to a driving electrode substrate, a second operation for attracting the first movable part and a second movable part to stripe electrodes, a third operation for attracting the second movable part to the driving electrode substrate, and a fourth operation for attracting the first and second movable parts to the stripe electrodes.

4 Claims, 12 Drawing Sheets

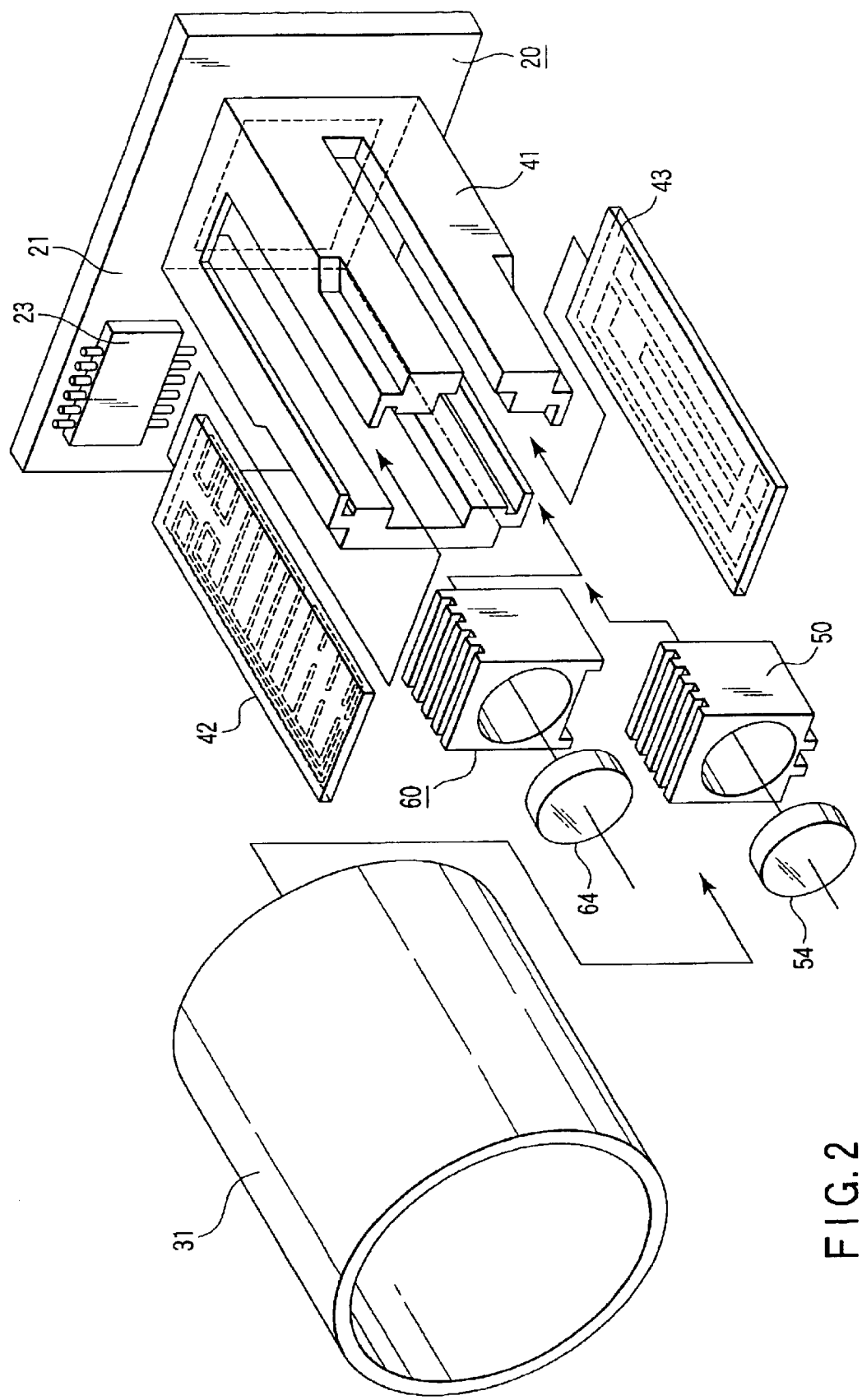
F I G. 2

One group separate drive   First movable part: Sensor side, Second movable part: Fixed

| | Attraction phase of first movable part | | | | | | | | | | | | | | | |
|---|---|---|---|---|---|---|---|---|---|---|---|---|---|---|---|---|
| | AB phase | | | | BC phase | | | | CD phase | | | | DA phase | | | |
| Attraction phase of second movable part | AB phase | | | | AB phase | | | | AB phase | | | | AB phase | | | |
| | α | β | γ | δ | α | β | γ | δ | α | β | γ | δ | α | β | γ | δ |
| Electrode A (ch1) | H | | | H | H | | | | | | | | | H | | |
| Electrode B (ch2) | H | | H | H | | | H | H | | H | H | | | | | |
| Electrode C (ch3) | | | H | H | H | H | | H | H | H | | H | H | | | H |
| Electrode D (ch4) | | H | H | H | H | | H | H | | H | H | | | | | H |
| Second movable part stripe electrode (ch5) | H | H | H | | | H | H | | | H | H | | | H | H | |
| First movable part stripe electrode (ch6) | | | H | H | | | H | H | H | H | | | H | H | | |
| First movable part electrode (ch7) | H | H | | H | H | H | | H | H | | | H | H | | | H |
| Second movable part electrode (ch8) | H | H | | | H | | | | | | | H | | | H | |

F I G . 5

One group separate drive  First movable part: Fixed, Second movable part: Move to sensor side

| | Attraction phase of first movable part | | | | | | | | | | | | | | | |
|---|---|---|---|---|---|---|---|---|---|---|---|---|---|---|---|---|
| | AB phase | | | | AB phase | | | | AB phase | | | | AB phase | | | |
| | Attraction phase of second movable part | | | | | | | | | | | | | | | |
| | AB phase | | | | BC phase | | | | CD phase | | | | DA phase | | | |
| | α | β | γ | δ | α | β | γ | δ | α | β | γ | δ | α | β | γ | δ |
| Electrode A (ch1) | H | | | H | | | H | H | | | H | H | H | H | | |
| Electrode B (ch2) | H | H | | | H | H | | | H | H | | | | H | | |
| Electrode C (ch3) | | H | H | | | H | H | | | H | H | | | | H | H |
| Electrode D (ch4) | | | H | H | H | | | H | H | | | H | H | | | H |
| Second movable part stripe electrode (ch5) | | H | H | H | H | H | | H | | H | H | H | H | | H | H |
| First movable part stripe electrode (ch6) | H | | H | H | H | | H | H | H | | H | H | H | | H | H |
| First movable part electrode (ch7) | | H | | | H | | | H | | H | | | H | | H | |
| Second movable part electrode (ch8) | H | | | H | | H | H | | H | | H | | | H | | H |

FIG. 6

One group separate drive   First movable part : Fixed, Second movable part : Move to subject side

| | Attraction phase of first movable part | | | | | | | | | | | | | | | |
|---|---|---|---|---|---|---|---|---|---|---|---|---|---|---|---|---|
| | AB phase | | | | AB phase | | | | AB phase | | | | AB phase | | | |
| | Attraction phase of second movable part | | | | | | | | | | | | | | | |
| | AB phase | | | | DA phase | | | | CD phase | | | | BC phase | | | |
| | α | β | γ | δ | α | β | γ | δ | α | β | γ | δ | α | β | γ | δ |
| Electrode A (ch1) | H | H | | | H | | | | H | | | | H | H | | |
| Electrode B (ch2) | H | | | | | H | H | H | | H | H | | | H | H | H |
| Electrode C (ch3) | | H | H | | | H | H | | | | H | H | | | H | H |
| Electrode D (ch4) | | | H | H | H | | | H | H | | | H | H | | | H |
| Second movable part stripe electrode (ch5) | H | H | H | H | H | H | H | H | H | H | H | H | H | H | H | H |
| First movable part stripe electrode (ch6) | H | H | H | H | H | H | H | H | H | H | H | H | H | H | H | H |
| First movable part electrode (ch7) | | | | | | | | | | | | | | | | |
| Second movable part electrode (ch8) | H | | | | H | H | H | H | H | H | H | H | H | H | H | H |

FIG. 7

One group separate drive  First movable part: Move to subject side, Second movable part: Fixed

| | Attraction phase of first movable part | | | | Attraction phase of second movable part | | | | | | | | | | | | | | | |
|---|---|---|---|---|---|---|---|---|---|---|---|---|---|---|---|---|---|---|---|---|
| | AB phase | | | | DA phase | | | | CD phase | | | | AB phase | | | | BC phase | | | |
| | | | | | AB phase | | | | AB phase | | | | AB phase | | | | AB phase | | | |
| | α | β | γ | δ | α | β | γ | δ | α | β | γ | δ | α | β | γ | δ | α | β | γ | δ |
| Electrode A (ch1) | H | | | | H | | | | | | | H | | | H | | | | H | H |
| Electrode B (ch2) | | H | | | | H | | | | H | | | | H | | | | | | H |
| Electrode C (ch3) | | | H | H | | | H | H | | | H | H | | | H | H | H | H | | |
| Electrode D (ch4) | | | H | H | | | H | H | | | H | H | | | H | H | | H | H | |
| Second movable part stripe electrode (ch5) | | | H | H | | | H | H | | | H | H | | | H | H | | | H | H |
| First movable part stripe electrode (ch6) | H | H | | | | H | H | | | H | H | | | H | H | | H | H | | |
| First movable part electrode (ch7) | | | H | | | H | | | H | | | | H | | | | | | H | |
| Second movable part electrode (ch8) | H | H | | | H | H | | | H | H | | | H | H | | | | H | H | |

FIG. 8

One group separate drive  First movable part : Move to sensor side, Second movable part : Move to sensor side

| | Attraction phase of first movable part ||||||||||||||||| Attraction phase of second movable part ||
|---|---|---|---|---|---|---|---|---|---|---|---|---|---|---|---|---|---|---|
| | AB phase |||| BC phase |||| CD phase |||| DA phase |||| AB phase | CD phase |
| | α | β | γ | δ | α | β | γ | δ | α | β | γ | δ | α | β | γ | δ | AB phase | CD phase |
| Electrode A (ch1) | H | H | | | | H | | | | | | | | | H | H | | |
| Electrode B (ch2) | H | | | | H | H | H | | | H | | | | | | | | |
| Electrode C (ch3) | | | H | H | | H | H | H | H | H | | | | | | | H | H |
| Electrode D (ch4) | | | H | | | | | H | | H | H | H | | H | H | | H | H |
| Second movable part stripe electrode (ch5) | H | | | | | H | H | H | H | H | | | | H | H | | H | H |
| First movable part stripe electrode (ch6) | H | H | | | H | H | | | | H | H | | | H | H | | | |
| First movable part electrode (ch7) | | H | H | H | | H | H | H | | H | H | H | | H | H | H | H | H |
| Second movable part electrode (ch8) | | H | H | H | | H | H | H | | H | H | H | | H | H | H | H | H |

FIG. 9

One group separate drive  First movable part: Move to sensor side, Second movable part: Move to subject side

| Attraction phase of first movable part | AB phase | | | | BC phase | | | | CD phase | | | | DA phase | | | |
|---|---|---|---|---|---|---|---|---|---|---|---|---|---|---|---|---|
| Attraction phase of second movable part | AB phase | | | | DA phase | | | | CD phase | | | | BC phase | | | |
| | α | β | γ | δ | α | β | γ | δ | α | β | γ | δ | α | β | γ | δ |
| Electrode A (ch1) | H |   |   |   | H |   |   |   |   |   |   |   |   |   | H | H |
| Electrode B (ch2) | H | H |   |   |   |   |   |   |   |   |   |   |   |   |   | H |
| Electrode C (ch3) |   | H | H |   |   |   |   |   |   | H |   |   |   |   |   |   |
| Electrode D (ch4) |   |   | H | H |   | H |   |   |   | H | H |   |   |   |   |   |
| Second movable part stripe electrode (ch5) | H | H |   |   | H | H |   |   |   | H | H |   |   | H | H |   |
| First movable part stripe electrode (ch6) |   |   |   | H |   |   |   | H |   |   |   | H |   |   |   | H |
| First movable part electrode (ch7) | H | H |   |   |   |   | H | H |   |   | H | H |   | H | H |   |
| Second movable part electrode (ch8) |   |   | H | H | H |   |   | H | H | H |   |   |   |   |   | H |

FIG. 10

One group separate drive   First movable part : Move to subject side, Second movable part : Move to sensor side

| | Attraction phase of first movable part | | | | | | | | | | | | | | | | Attraction phase of second movable part | | | | | | | | | | | | | | | |
|---|---|---|---|---|---|---|---|---|---|---|---|---|---|---|---|---|---|---|---|---|---|---|---|---|---|---|---|---|---|---|---|---|
| | AB phase | | | | DA phase | | | | CD phase | | | | BC phase | | | | AB phase | | | | BC phase | | | | CD phase | | | | DA phase | | | |
| | α | β | γ | δ | α | β | γ | δ | α | β | γ | δ | α | β | γ | δ | α | β | γ | δ | α | β | γ | δ | α | β | γ | δ | α | β | γ | δ |
| Electrode A (ch1) | H | | | | H | | | H | | | | | | | | | H | | | | | | | | | | | | H | H | | |
| Electrode B (ch2) | H | H | | | | | | | | | | | H | H | | | H | H | | | H | H | | | | | | | | | | |
| Electrode C (ch3) | | H | H | | | | | | H | H | | | | H | | | | H | H | | | H | H | | H | H | | | | | | |
| Electrode D (ch4) | | | H | H | | H | H | | H | | | | | | | | | | H | H | | | H | H | H | | | | | | | |
| Second movable part stripe electrode (ch5) | H | | | H | H | H | | | | H | H | | | | H | H | | | | | | | | | | | | | | | | |
| First movable part stripe electrode (ch6) | | | | | | | | | | | | | | | | | | H | | H | H | | H | | H | | H | | | H | | H |
| First movable part electrode (ch7) | H | | | | H | | | H | | H | | H | | | H | | | | | | | | | | | | | | | | | |
| Second movable part electrode (ch8) | | | | | | | | | | | | | | | | | | H | | H | H | | H | | H | | H | | | H | | H |

FIG. 11

One group separate drive   First movable part : Move to subject side, Second movable part : Move to subject side

| | Attraction phase of first movable part | | | | | | | | | | | | | | | |
|---|---|---|---|---|---|---|---|---|---|---|---|---|---|---|---|---|
| | Attraction phase of second movable part | | | | | | | | | | | | | | | |
| | AB phase | | | | DA phase | | | | CD phase | | | | BC phase | | | |
| | α | β | γ | δ | α | β | γ | δ | α | β | γ | δ | α | β | γ | δ |
| Electrode A (ch1) | H | H | | | H | | | | | | | H | | | H | H |
| Electrode B (ch2) | H | | | | | | H | H | H | H | | | | | | H |
| Electrode C (ch3) | | | H | H | | H | H | | | H | H | | H | | | |
| Electrode D (ch4) | | | H | H | H | H | | | | | H | H | | H | | |
| Second movable part stripe electrode (ch5) | | H | H | | | H | H | | | H | H | | | H | H | |
| First movable part stripe electrode (ch6) | H | H | | | H | H | | | H | H | | | H | H | | |
| First movable part electrode (ch7) | | H | H | H | | H | H | H | | H | H | H | | H | H | H |
| Second movable part electrode (ch8) | H | H | H | H | H | H | H | H | H | H | H | H | H | H | H | H |

F I G. 12

ZOOM LENS UNIT AND METHOD OF DRIVING THE SAME

CROSS-REFERENCE TO RELATED APPLICATIONS

This application is based upon and claims the benefit of priority from the prior Japanese Patent Application No. 2002-287361, filed Sep. 30, 2002, the entire contents of which are incorporated herein by reference.

BACKGROUND OF THE INVENTION

1. Field of the Invention

The present invention relates to a zoom lens unit and a method of driving the same for driving lenses using an electrostatic actuator, and more particularly, to a zoom lens unit and a method of driving the same capable of separately controlling a plurality of movable parts.

2. Description of the Related Art

In recent years, assembling a camera unit having a zoom function in mobile equipment such as mobile phones has been examined. In such a camera unit, the focal point is adjusted by driving lenses, and an image is finally formed on a sensor. Electrostatic actuators may be used as a drive source for driving the lenses along the optical axis.

The zoom lens unit adjusts the zoom magnification by driving a plurality of lenses. The electrostatic actuator includes, for example, a stationary part, a first movable part, and a second movable part, and each of the first and second movable parts holds a lens.

The stationary part includes a driving electrode substrate and a holding electrode substrate attached to the upper and lower inner walls of a stationary part frame in FIG. 1. Further, the first and second movable parts are disposed such that they can be reciprocated in the axial direction of the lenses with a gap of several microns between the pair of electrode substrates.

In the zoom lens unit configured as described above, the first and second movable parts can be driven by an electrostatic force by supplying a voltage to the electrodes of the pair of electrode substrates of the stationary part in a predetermined sequence using a switching circuit.

The zoom lens unit described above has the following problems. That is, when the common electrode substrates are used with respect to the plurality of movable parts, the plurality of movable parts can be driven only separately, respectively, because one of the movable parts is driven by supplying the voltage to the driving electrode substrate in the predetermined sequence while holding the other of the movable parts by the holding electrode substrate.

In the zoom lens unit, the respective lenses must trace a zoom curve based on predetermined lens design to vary the zoom magnification. When the zoom curve is traced, it is not preferable to separately drive the respective groups of lenses. This is because when the lenses are driven separately, the zoom magnification is not continuously varied at a constant speed and is changed intermittently, and the user gets the impression that the image is irregularly output onto a screen and it is difficult to view the image.

When, for example, a second group of lenses acts to vary the zoom magnification and a first group of lenses acts to adjust the focal point, the zoom curve is traced in such a sequence that the magnification is varied by moving the second group of lenses first and then focusing is executed by driving the first group of lenses, thereby the magnification is varied intermittently.

To prevent the above problem, the plurality of movable parts must be simultaneously driven in the same direction or in an opposite direction. However, to drive the plurality of movable parts independently, as many stationary parts as movable parts are required, which increases the volume of an actuator unit with an increase in its size. Note that there is a configuration by which the plurality of movable parts are driven independently by devising the disposition of the electrodes of the stationary part. In the configuration, however, a driving force may be in short supply.

Further, when a plurality of movable parts are provided in other drive systems (for example, an electromagnetic device and a piezoelectric device), as many stationary parts as the movable parts are necessary, thereby the volume of the actuator unit is increased with an increase in its size.

In contrast, when the plurality of movable parts are simultaneously driven using a cam mechanism and the like, it is difficult to drive the movable parts separately. Thus, it is difficult to adjust the focal point and to cope with a change of the focal point due to a change of temperature in an external environment which are required to a lens unit. In this case, a significant burden is placed on the selection of a lens material and on the optical design of lenses.

BRIEF SUMMARY OF THE INVENTION

An object of the present invention is to drive a plurality of movable parts simultaneously in the same direction or in an opposite direction even if electrode substrates on a stationary part side are commonly used.

A zoom lens unit of the present invention for forming a subject image on an image pick-up device comprises a stationary part, first and second movable parts to reciprocate in predetermined directions by being guided by the stationary part, each movable part having electrodes formed on surfaces and supporting a lens, at least one of the electrodes being one used to hold the movable part, wherein the stationary part comprises a driving electrode substrate having a plurality of groups of electrodes formed thereon in a predetermined direction at a constant pitch to drive the first and second movable parts, a holding electrode unit having a pair of electrodes corresponding to the electrodes of the first and second movable parts to selectively attract and hold the first and second movable parts, and a drive control circuit for sequentially energizing the groups of the electrodes of the driving electrode substrate as well as for selectively energizing the electrodes of the holding electrode unit, wherein the drive control circuit executes a cycle at least once while at least one of the first and second movable parts moves one pitch of an electrode of the plurality of groups of the electrodes when the first and second movable parts are moved in a different direction, wherein the cycle comprises a first operation for simultaneously grounding the electrodes of the first movable part and the electrodes of the holding electrode unit corresponding to the electrodes as well as attracting the first movable part to the driving electrode substrate by energizing one group of the electrodes of the plurality of groups of the electrodes, a second operation executed just after the first operation to energize ones of the holding electrodes and the electrodes such that the first and second movable parts are attracted to the pair of electrodes of the holding electrode unit, a third operation executed just after the second operation to simultaneously ground the electrodes of the second movable part and the electrodes of the holding electrode unit corresponding to the electrodes as well as to attract the second movable part to the driving electrode substrate by energizing at least one group of the electrodes of the plurality of groups of the electrodes, and a fourth operation executed just after the third operation to energize ones of the holding electrodes and the electrodes such that the first and second movable parts are attracted to the pair of electrodes of the holding electrode unit.

A method of driving a zoom lens unit of the present invention for executing a zoom operation by driving a first movable part and a second movable part, which are disposed so as to reciprocate in predetermined directions by being guided by a stationary part and each of which holds a lens, in a different direction such that a subject image is formed on an image pick-up device, the method comprising the step of executing a cycle at least once while at least one of the first movable part and the second movable part moves one pitch of an electrode of a plurality of groups of electrodes, wherein the cycle comprises a first step for simultaneously grounding the electrodes of the first movable part and the electrodes of a holding electrode unit corresponding to the electrodes as well as attracting the first movable part to a driving electrode substrate by energizing one group of the electrodes of the plurality of groups of the electrodes, a second step executed just after the first step to energize the holding electrodes and the electrodes such that the first and second movable parts are attracted to a pair of electrodes of the holding electrode unit, a third step executed just after the second step to simultaneously ground the electrodes of the second movable part and the electrodes of the holding electrode unit corresponding to the electrodes as well as to attract the second movable part to the driving electrode substrate by energizing one group of the electrodes of the plurality of groups of the electrodes, and a fourth step executed just after the third step to energize ones of the holding electrodes and the electrodes such that the first and second movable parts are attracted to the pair of electrodes of the holding electrode unit, and the stationary part comprises the driving electrode substrate having the plurality of groups of the electrodes formed thereon in a predetermined direction at a constant pitch to drive the first and second movable parts, and the holding electrode unit having the pair of electrodes corresponding to the electrodes of the first and second movable parts to selectively attract and hold the first and second movable parts.

BRIEF DESCRIPTION OF THE SEVERAL VIEWS OF THE DRAWING

FIG. 2 is an exploded perspective view of the image pick-up apparatus;

FIG. 5 is a view explaining the driving patterns in an operation mode M1 of the image pick-up apparatus;

FIG. 6 is a view explaining the driving patterns in an operation mode M2 of the image pick-up apparatus;

FIG. 7 is a view explaining the driving patterns in an operation mode M3 of the image pick-up apparatus;

FIG. 8 is a view explaining the driving patterns in an operation mode M4 of the image pick-up apparatus;

FIG. 9 is a view explaining the driving patterns in an operation mode M5 of the image pick-up apparatus;

FIG. 10 is a view explaining the driving patterns in an operation mode M6 of the image pick-up apparatus;

FIG. 11 is a view explaining the driving patterns in an operation mode M7 of the image pick-up apparatus; and FIG. 12 is a view explaining the driving patterns in an operation mode M8 of the image pick-up apparatus.

DETAILED DESCRIPTION OF THE INVENTION

Figure 1:
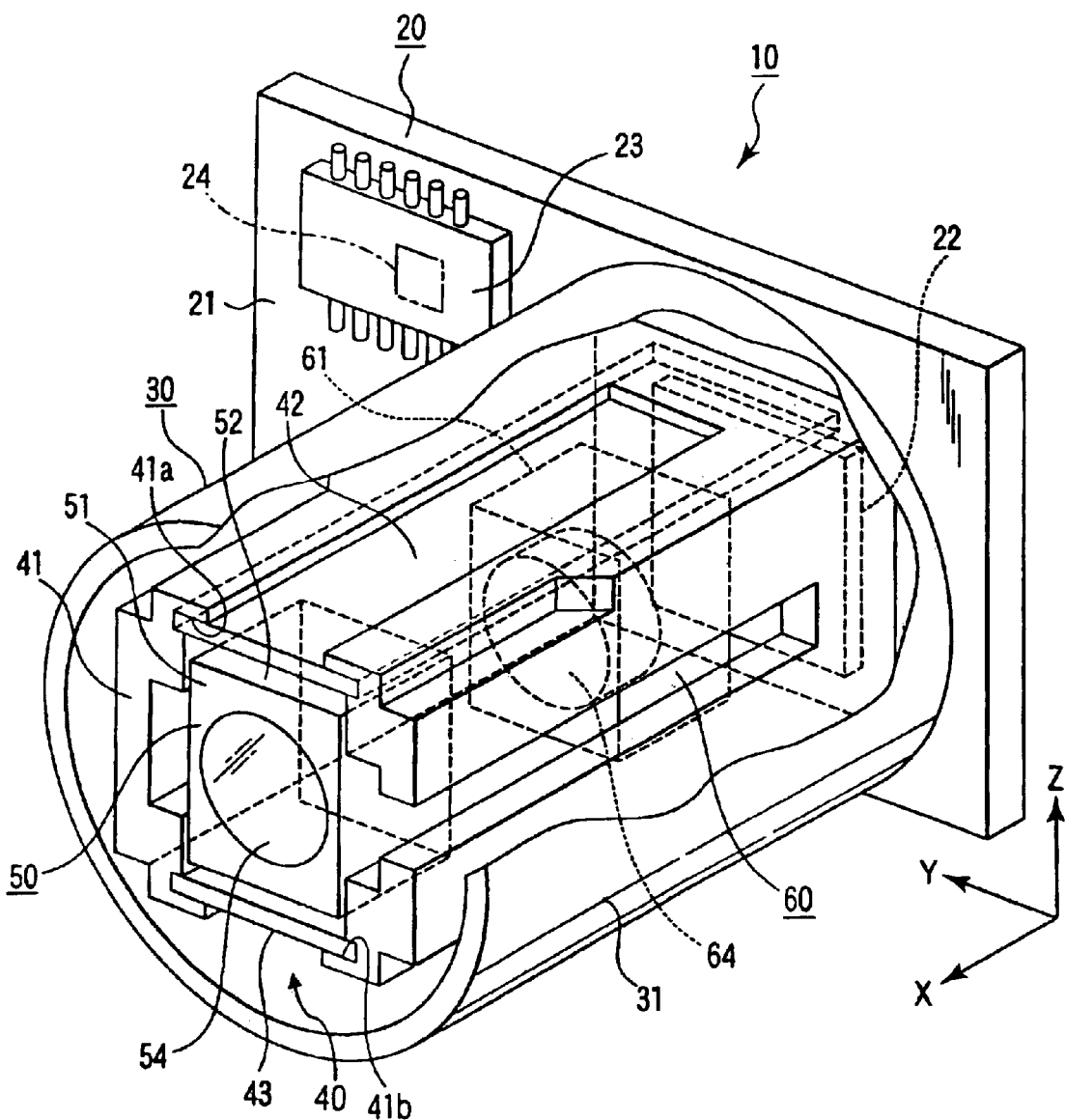
FIG. 1 is a perspective view, partly notched, of an image pick-up apparatus according to an embodiment of the present invention.
Figure 3A:
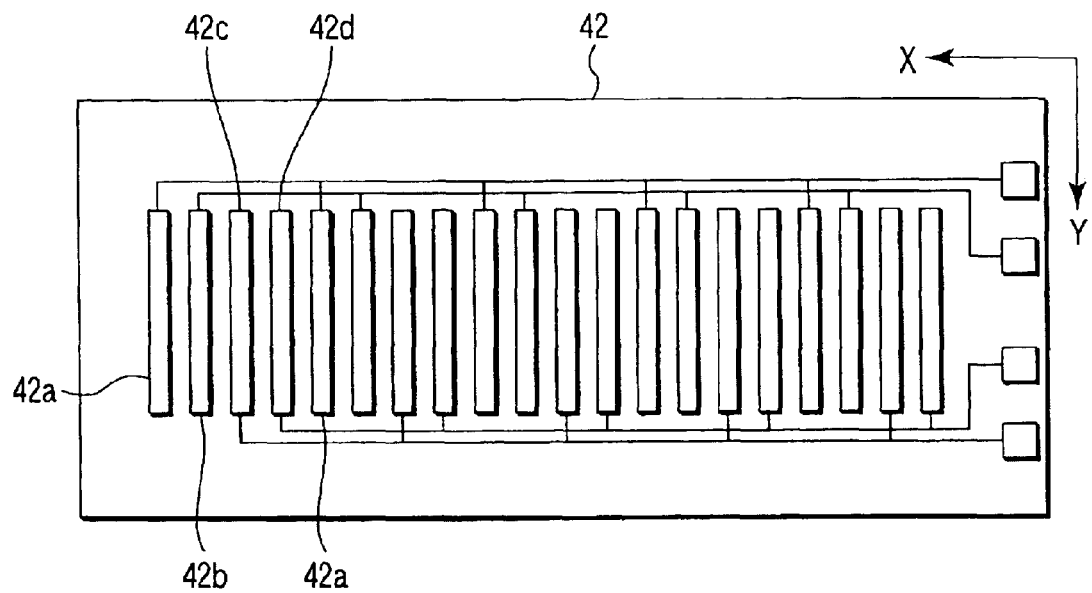
FIG. 3A is a plan view schematically showing a driving electrode substrate incorporated in the image pick-up apparatus.
Figure 3B:
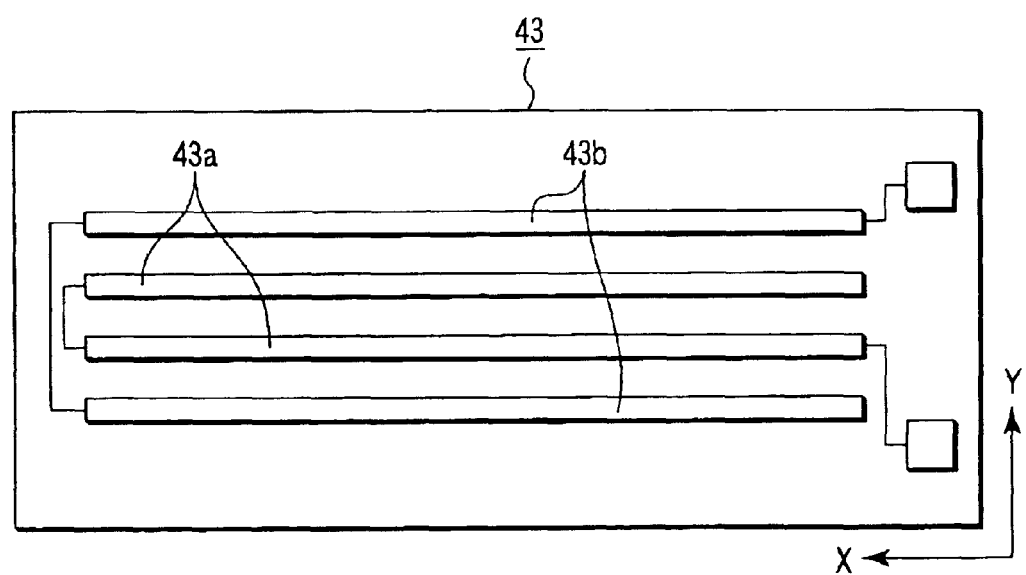
FIG. 3B is a plan view schematically showing a holding electrode substrate incorporated in the image pick-up apparatus.
Figure 4:
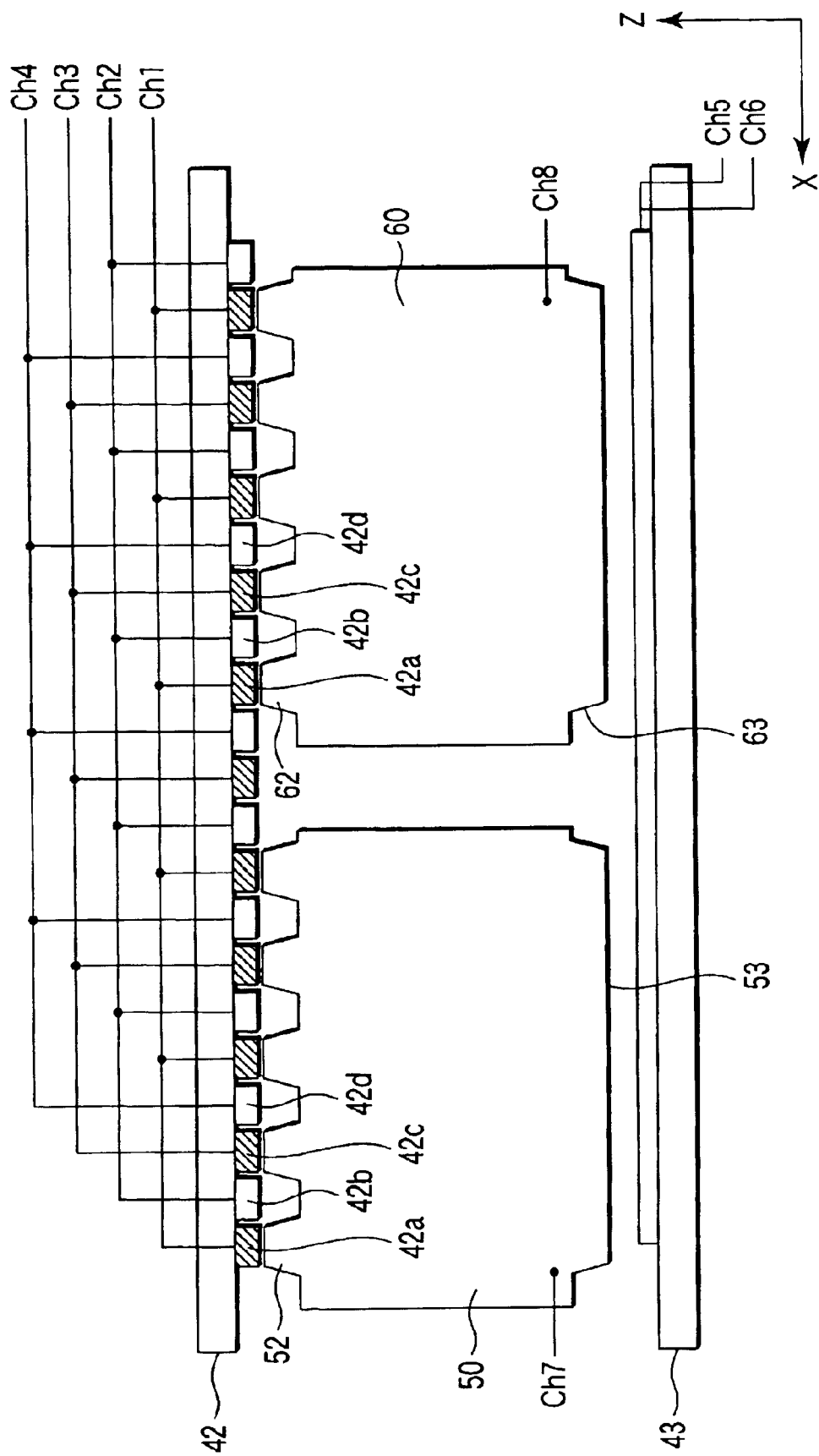
FIG. 4 is a sectional view schematically showing the relationship between a stationary part and movable parts incorporated in the image pick-up apparatus.

FIG. 1 is a perspective view, partly notched, of an image pick-up apparatus 10 according to a first embodiment of the present invention, FIG. 2 is an exploded perspective view showing the image pick-up apparatus 10, FIG. 3A is a plan view schematically showing a driving electrode substrate, FIG. 3B is a plan view schematically showing a holding electrode substrate, and FIG. 4 is a longitudinal sectional view schematically showing a zoom lens unit 30. In these figures, arrows X, Y and Z shows three directions intersecting with each other, and in particular, the arrow X shows the moving direction of first and second movable parts 50 and 60. Further, FIGS. 5 to 8 are views explaining a drive control method when only one of the movable parts is driven, and FIGS. 9 to 12 are views explaining drive patterns when the two movable parts are driven simultaneously.

The image pick-up apparatus 10 includes an image pick-up device unit 20 and a zoom lens unit 30. The image pick-up device unit 20 includes a substrate 21, a sensor 22 such as a CCD or the like and a control electronic part 23 each disposed on the substrate 21. The electronic part 23 has a drive control circuit 24 incorporated therein.

The zoom lens unit 30 includes a cylindrical cover 31, a stationary part 40, the first movable part 50, and the second movable part 60. The first and second movable parts 50 and 60 are inserted into a stationary part frame 41 (which will be described later) such that they can move in the X direction (as shown FIG. 1) while separating from each other.

The stationary part 40 includes the stationary part frame 41 composed of a hollow frame member having a passing-though portion and being formed in a cuboid shape. The stationary part frame 41 has an upper inner surface 41a, a lower inner surface 41b, and side inner surfaces 41c and 41d, and a driving electrode substrate 42 for driving the first and second movable parts 50 and 60 is attached to the upper inner surface 41a. Further, a holding electrode substrate 43 for holding the first and second movable parts 50 and 60 at their positions is attached to the lower inner surface 41b.

As shown in FIG. 3A, the driving electrode substrate 42 is made by forming a desired pattern on the surface of a glass sheet, and a plurality of groups of driving electrodes 42a to 42d, each of which extends in the Y-direction perpendicular to the moving direction X, are disposed in parallel with each other on the glass sheet. Note that the respective electrodes have a width of about 20 $\mu$m and intervals between the electrodes are 20 $\mu$m and the respective electrodes are disposed at a pitch of about 40 $\mu$m.

The driving electrodes 42a to 42d are connected to the drive control circuit 24 of the electronic part 23 and driven in response to control voltage signals applied thereto from the drive control circuit 24. That is, the voltage signals are applied independently to the driving electrodes 42a to 42d of the respective groups. When, for example, a voltage is applied to the driving electrodes 42a, the voltage signal is applied to the convex portions corresponding to the driving electrodes 42a of all the groups on the driving electrode substrate 42. The driving electrodes 42a correspond to a channel 1 (ch1), the driving electrodes 42b correspond to a channel 2 (ch2), the driving electrodes 42c correspond to a channel 3 (ch3), and the driving electrodes 42d correspond to a channel 4 (ch4).

As shown in FIG. 3B, the holding electrode substrate 43 is made by forming a desired pattern on the surface of a glass sheet, and stripe electrodes 43a, which correspond to the first movable part electrodes 53 (which will be described later) of the first movable part 50, and stripe electrodes 43b, which correspond to the second movable part electrodes 63 (which will be described later) of the second movable part 60, are formed parallel to each other on the glass sheet. The second movable part stripe electrodes 43b correspond to a channel 5 (ch5), and the first movable part stripe electrodes 43a correspond to a channel 6 (ch6). Further, these stripe electrodes 43a and 43b are disposed electrically independently so that the first and second movable parts 50 and 60 can be controlled independently.

The first movable part 50 includes an approximately cuboid support member 51 formed of a conductive member having a hollow portion. A movable part side driving electrode 52 is formed on the upper surface of the support member 51, and a first movable part electrode 53 is formed on the lower surface thereof. Further, a lens 54 is fixed in the hollow portion.

The movable part side driving electrode 52 has a plurality of projecting stripes extending thereon, the projecting stripes being formed by etching so as to be orthogonal to the moving direction X of the first movable part 50, thereby concave portions and convex portions are formed by the plurality of stripes in parallel with each other in the moving direction X. The intervals between the concave portions and the convex portions are set to about 40 μm, and the convex portions have a height of about 10 μm from the surface in the concave portions. The height is set to at least 10 μm and may be larger than 10 μm. That is, the end surface of each convex portion of the movable part side driving electrode 52 has a width equal to the width of the two electrodes 42a and 42b of the driving electrode substrate 42, the bottom surface of each concave portion of the movable part side driving electrode 52 has a width equal to the width of the two electrodes 42c and 42d, and the concave portions and the convex portions of the movable part side driving electrode 52 are disposed at a pitch of about 80 μm.

The first movable part electrode 53 is extended in the moving direction of the first movable part 50, and a plurality of projecting stripes are formed by etching in the first movable part electrode 53 so that they are disposed in parallel with each other in the Y-direction. The first movable part electrode 53 corresponds to a seven channel 7 (ch7).

The second movable part 60 includes an approximately cuboid support member 61 formed of a conductive member having a hollow portion. A movable part side driving electrode 62 is formed on the upper surface of the support member 61, and a second movable part electrode 63 is formed on the lower surface thereof. Further, a lens 64 is fixed in the hollow portion.

The movable part side driving electrode 62 has a plurality of projecting stripes extending thereon, the projecting stripes being formed by etching so as to be orthogonal to the moving direction X of the second movable part 60, thereby concave portions and convex portions are formed by the plurality of stripes parallel to each other in the moving direction X. The intervals between the concave portions and the convex portions are set to about 40 μm, and the convex portions have a height of about 10 μm from the surface in the concave portions. The height is set to at least 10 μm and may be larger than 10 μm. That is, the end surface of each convex portion of the movable part side driving electrode 62 has a width equal to the width of the two electrodes 42a and 42b of the driving electrode substrate 42, the bottom surface of each concave portion of the movable part side driving electrode 62 has a width equal to the width of the two electrodes 42c and 42d, and the concave portions and the convex portions of the movable part side driving electrode 62 are disposed at a pitch of about 80 μm.

The second movable part electrode 63 is extended in the moving direction of the first movable part 50, and a plurality of projecting stripes are formed in the second movable part electrode 63 by etching so as to be disposed parallel to each other in the Y-direction.

Further, a lens system composed of both the lenses 54 and 64 is zoomed between a wide side and a telescopic side by changing the positions of the lens 54 of the first movable part 50 and the lens 64 of the second movable part 60, and a subject is focused according to a zoomed focal length.

In the image pick-up apparatus 10 configured as described above, the first and second movable parts 50 and 60 are driven as described below. That is, the first and second movable parts 50 and 60 are driven in a total of eight operation modes, i.e., one group separate drive modes (operation modes M1 to M4) in which only one of the movable parts are driven and both group separate drive modes (operation modes M5 to M8) in which both movable parts are simultaneously driven.

In the "operation mode M1", the first movable part 50 is moved to the sensor 22 side, and the second movable part 60 is fixed. In the "operation mode M2", the first movable part 50 is fixed, and the second movable part 60 is moved to the sensor 22 side. In the "operation mode M3", the first movable part 50 is fixed, and the second movable part 60 is moved to a subject side. In the "operation mode M4", the first movable part 50 is moved to the subject side, and the second movable part 60 is fixed.

In the "operation mode M5", the first and second movable parts 50 and 60 are moved to the sensor 22 side. In the "operation mode M6", the first movable part 50 is moved to the sensor 22 side, and the second movable part 60 is moved to the subject side. In the "operation mode M7", the first movable part 50 is moved to the subject side, and the second movable part 60 is moved to the sensor 22 side. In the "operation mode M8", the first and second movable parts 50 and 60 are moved to the subject side.

The eight operation modes M1 to M8 will be explained using FIGS. 5 to 12, respectively. In the explanation, "H" means to set a potential at a high level by energization, and "GND" means to set to the potential to zero by grounding. In the figures, the former is shown by "H", and the latter is shown by a blank.

FIG. 5 is a view explaining the driving patterns in the operation mode M1. The operation mode M1 is a driving method of moving the first movable part 50 to the sensor 22 side and fixing the second movable part 60. Note that the operation mode M1 is roughly composed of four operating sections 1 to 4, and each of the four operating sections includes four energizing patterns α to δ.

(1) Section 1 (Attraction Phase of First Movable Part: AB Phase, Attraction Phase of Second Movable Part: AB Phase)

In the energizing pattern α, the first movable part electrode 53 is set to GND, and the second movable part electrode 63 is set to H. Further, the potential of the first and second movable part stripe electrodes 43a and 43b is set to GND. With the above operations, the second movable part electrodes 63 are attracted to the second movable part stripe electrodes 43b, and the second movable part 60 is held at its position. In contrast, the driving electrodes 42a and 42b are set to H. With this operation, the movable part side driving electrode 52 in the vicinity of the driving electrodes 42a and 42b is attracted to the driving electrodes 42a and 42b by electrostatic force, thereby the movable part side driving electrode 52 is attracted to the driving electrodes 42a and 42b. Accordingly, only the first movable part 50 is moved to the driving electrode substrate 42 side.

Next, in the energizing pattern β, the first movable part electrode 53 is set to GND, and the second movable part electrode 63 is set to H. Further, the potential of the first movable part stripe electrodes 43a are set to H, and the potential of the second movable part stripe electrodes 43b is set to GND. In contrast, the potential of the driving electrodes 42b is set to a high level (H). With the above operations, the first movable part electrode 53 is attracted to the first movable part stripe electrodes 43a, and the first movable part 50 is moved to the holding electrode substrate 43 side. Note that since the second movable part electrode 63 is attracted to the second movable part stripe electrodes 43b, the second movable part 60 remains held on the holding electrode substrate 43 side.

Next, in the energizing pattern γ, the first movable part electrode 53 is set to H, and the second movable part electrode 63 is set to GND. Further, the first and second movable part stripe electrodes 43a and 43b are set to H. With the above operations, the second movable part electrodes 63 are attracted to the second movable part stripe electrodes 43b, and the second movable part 60 is held at its position. In contrast, the driving electrodes 42c and 42d are set to H. With this operation, the movable part side driving electrode 52 in the vicinity of the driving electrodes 42c and 42d is attracted to the driving electrodes 42c and 42d by electrostatic force, thereby the movable part side driving electrode 52 is attracted to the driving electrodes 42c and 42d. Accordingly, only the first movable part 50 is moved to the driving electrode substrate 42 side.

Next, in the energizing pattern δ, the first movable part electrode 53 is set to H, and the second movable part electrode 63 is set to GND. Further, the first movable part stripe electrodes 43a are set to GND, and the second movable part stripe electrodes 43b are set to H. In contrast, the driving electrodes 42a, 42c and 42d are set to H.

With the above operations, the first movable part electrode 53 is attracted to the first movable part stripe electrodes 43a, and the first movable part 50 is moved to the holding electrode substrate 43 side. Note that since the second movable part electrode 63 is attracted to the second movable part stripe electrodes 43b, the second movable part 60 remains held on the holding electrode substrate 43 side.

Repeating the energizing patterns α to δ a plurality of times moves the first movable part 50 to the AB phase side and causes the second movable part 60 to stay in the AB phase.

(2) Section 2 (Attraction Phase of First Movable Part: BC Phase, Attraction Phase of Second Movable Part: AB Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 5 a plurality of times in the section 2 moves the first movable part 50 to the BC phase side and causes the second movable part 60 to stay in the AB phase.

(3) Section 3 (Attraction Phase of First Movable Part: CD Phase, Attraction Phase of Second Movable Part: AB Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 5 a plurality of times in section 3 moves the first movable part 50 to the CD phase side and causes the second movable part 60 to stay in the AB phase.

(4) Section 4 (Attraction Phase of First Movable Part: DA Phase, Attraction Phase of Second Movable Part: AB Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 5 a plurality of times in the section 4 moves the first movable part 50 to the DA phase side and causes the second movable part 60 to stay in the AB phase.

The first movable part 50 is moved to the sensor 22 side by executing the operations (1) to (4) described above. It is possible to move only the first movable part 50 to a desired position by repeating these operations.

FIG. 6 is a view explaining the driving patterns in the operation mode M2. The operation mode M2 is a driving method of fixing the first movable part 50 and moving the second movable part 60 to the sensor 22 side. In the operation mode M2, it is possible to move only the second movable part 60 to a desired position by executing energization according to the driving patterns shown in FIG. 6.

FIG. 7 is a view explaining the driving patterns in the operation mode M3. The operation mode M3 is a driving method of fixing the first movable part 50 and moving the second movable part 60 to the subject side. In the operation mode M3, it is possible to move only the second movable part 60 to a desired position by executing energization according to the driving patterns shown in FIG. 7.

FIG. 8 is a view explaining the driving patterns in the operation mode M4. The operation mode M4 is a driving method of moving the first movable part 50 to the subject side and fixing the second movable part 60. In the operation mode M4, it is possible to move only the first movable part 50 to a desired position by executing energization according to the driving patterns shown in FIG. 8.

FIG. 9 is a view explaining the driving patterns in the operation mode M5. The operation mode M5 is a driving method of moving the first and second movable parts 50 and 60 to the sensor 22 side. Note that the driving mode M5 is roughly composed of four operating sections 1 to 4, and each of the four operating sections includes four energizing patterns α to δ.

(1) Section 1 (Attraction Phase of First Movable Part: AB Phase, Attraction Phase of Second Movable Part: AB Phase)

In the energizing pattern α, the first and second movable part electrodes 53 and 63 are set to GND. Further, the first and second movable part stripe electrodes 43a and 43b are set to GND.

In contrast, the driving electrodes 42a and 42b are set to H. With the above operations, the movable part side driving electrodes 52 and 62 in the vicinity of the driving electrodes 42a and 42b is attracted to the driving electrodes 42a and 42b by electrostatic force, thereby the movable part side driving electrode 52 is attracted to the driving electrodes 42a and 42b. Accordingly, the first and second movable parts 50 and 60 are moved to the driving electrode substrate 42 side.

Next, in the energizing pattern β, the first and second movable part electrodes 53 and 63 are set to GND. Further, the first and second movable part stripe electrodes 43a and 43b are set to H. In contrast, the driving electrodes 42b are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

Next, in the energizing pattern γ, the first and second movable part electrodes 53 and 63 of the first and second movable parts 50 and 60 are set to H. Further, the first and second movable part stripe electrodes 43a and 43b are set to H. In contrast, the driving electrodes 42c and 42d are set to H. With the above operations, the movable part side driving electrodes 52 and 62 in the vicinity of the driving electrodes 42c and 42d are attracted to the driving electrodes 42c and 42d by electrostatic force, thereby the movable part side driving electrode 52 is attracted to the driving electrodes 42c and 42d. Accordingly, the first and second movable parts 50 and 60 are moved to the driving electrode substrate 42 side.

Next, in the energizing pattern δ, the first and second movable part electrodes 53 and 63 of the first and second movable parts 50 and 60 are set to H. Further, the first movable part stripe electrodes 43a are set to H, and the second movable part stripe electrodes 43b are set to GND. In contrast, the driving electrodes 42a, 42c and 42d are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

(2) Section 2 (Attraction Phase of First Movable Part: BC Phase, Attraction Phase of Second Movable Part: BC Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 9 a plurality of times in the section 2 moves the first and second movable parts 50 and 60 to the BC phase side.

(3) Section 3 (Attraction Phase of First Movable Part: CD Phase, Attraction Phase of Second Movable Part: CD Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 9 a plurality of times in the section 3 moves the first and second movable parts 50 and 60 to the CD phase side.

(4) Section 4 (Attraction Phase of First Movable Part: DA Phase, Attraction Phase of Second Movable Part: DA Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 9 a plurality of times in the section 4 moves the first and second movable parts 50 and 60 to the DA phase side.

It is possible to move the first and second movable parts 50 and 60 to the sensor 22 side by executing the operations (1) to (4) described above.

FIG. 10 is a view explaining the driving patterns in the operation mode M6. The driving mode M6 is a driving method of moving the first movable part 50 to the sensor 22 side and moving the second movable part 60 to the subject side. Note that the driving mode M6 is roughly composed of four operating sections 1 to 4, and each of the four operating sections includes four energizing patterns α to δ.

(1) Section 1 (Attraction Phase of First Movable Part: AB Phase, Attraction Phase of Second Movable Part: AB Phase)

In the energizing pattern α, the first and second movable part electrodes 53 and 63 are set to GND. Further, the first and second movable part stripe electrodes 43a and 43b are set to GND. In contrast, the driving electrodes 42a and 42b are set to H. With the above operations, the movable part side driving electrodes 52 and 62 in the vicinity of the driving electrodes 42a and 42b are attracted to the driving electrodes 42a and 42b by electrostatic force, thereby the movable part side driving electrode 52 is attracted to the driving electrodes 42a and 42b. Accordingly, the first and second movable parts 50 and 60 are moved to the driving electrode substrate 42 side.

Next, in the energizing pattern β, the first movable part electrode 53 is set to GND, and the second movable part electrode 63 is set to H. Further, the first movable part stripe electrodes 43a are set to H, and the second movable part stripe electrodes 43b are set to GND. In contrast, the driving electrodes 42b and 42c are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

Next, in the energizing pattern γ, the first and second movable part electrodes 53 and 63 are set to H. Further, the first and second movable part stripe electrodes 43a and 43b are set to H. In contrast, the driving electrodes 42c and 42d are set to H. With the above operations, the movable part side driving electrodes 52 and 62 in the vicinity of the driving electrodes 42c and 42d are attracted to the driving electrodes 42c and 42d by electrostatic force, thereby the movable part side driving electrode 52 is attracted to the driving electrodes 42c and 42d. Accordingly, the first and second movable parts 50 and 60 are moved to the driving electrode substrate 42 side.

Next, in the energizing pattern δ, the first movable part electrode 53 of the first movable part 50 is set to GND, and the second movable part electrode 63 of the second movable part 60 is set to H. Further, the first movable part stripe electrodes 43a are set to GND, and the second movable part stripe electrodes 43b are set to H. In contrast, the driving electrodes 42a and 42d are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

(2) Section 2 (Attraction Phase of First Movable Part: BC Phase, Attraction Phase of Second Movable Part: DA Phase)

In the energizing pattern α, the first movable part electrode 53 is set to GND, and the second movable part electrode 63 is set to H. Further, the first movable part stripe electrodes 43a are set to GND, and the second movable part stripe electrodes 43b are set to H. In contrast, the driving electrodes 42b and 42c are set to H. With the above operations, the movable part side driving electrode 52 in the vicinity of the driving electrodes 42a and 42b is attracted to the driving electrodes 42a and 42b by electrostatic force, thereby the movable part side driving electrode 52 is attracted to the driving electrodes 42a and 42b. Accordingly, only the first movable part 50 is moved to the driving electrode substrate 42 side.

Next, in the energizing pattern β, the first and second movable part electrodes 53 and 63 are set to GND. Further, the first and second movable part stripe electrodes 43a and 43b are set to H. In contrast, the driving electrodes 42c and 42d are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

Next, in the energizing pattern γ, the first movable part electrode 53 is set to H, and the second movable part electrode 63 is set to GND. Further, the first movable part stripe electrodes 43a are set to H, and the second movable part stripe electrodes 43b are set to GND. In contrast, the driving electrodes 42a and 42d are set to H. With the above operations, the movable part side driving electrode 62 in the vicinity of the driving electrodes 42c and 42d are attracted to the driving electrodes 42c and 42d by electrostatic force, thereby the movable part side driving electrode 52 is attracted to the driving electrodes 42c and 42d. Accordingly, only the second movable part 60 is moved to the driving electrode substrate 42 side.

Next, in the energizing pattern δ, the first and second movable part electrodes 53 and 63 are set to H. Further, the first and second movable part stripe electrodes 43a and 43b are set to GND. In contrast, the driving electrodes 42a and 42b are set to H. With the above operations, the first movable part electrode 53 is attracted to the first movable part stripe electrodes 43a, the second movable part electrode 63 is attracted to the second movable part stripe electrodes 43b, and the first and second movable parts 50 and 60 are moved to the holding electrode substrate 43 side.

Repeating the energizing patterns α to δ shown in FIG. 10 a plurality of times in section 2 moves the first movable part 50 to the BC phase side, and the second movable part 60 is moved to the DA phase side.

(3) Section 3 (Attraction Phase of First Movable Part: CD Phase, Attraction Phase of Second Movable Part: CD Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 9 a plurality of times in the section 3 moves the first and second movable parts 50 and 60 to the CD phase side.

(4) Section 4 (Attraction Phase of First Movable Part: DA Phase, Attraction Phase of Second Movable Part: BC Phase)

Similarly to section 1, the driving electrodes 42a to 42d, the first movable part electrode 53, the second movable part electrode 63, the first movable part stripe electrodes 43a, and the second movable part stripe electrodes 43b are controlled by the energizing patterns α to δ.

Repeating the energizing patterns α to δ shown in FIG. 9 a plurality of times in section 4 moves the first movable part 50 to the DA phase side, and the second movable part 60 is moved to the BC phase side.

It is possible to move the first movable part 50 to the sensor 22 side and to move the second movable part 60 to the subject side by executing the operations (1) to (4) described above. In the operation mode M6, it is possible to move the first and second movable parts 50 and 60 to a desired position, respectively by executing energization according to the driving patterns shown in FIG. 10.

FIG. 11 is a view explaining the driving patterns in the operation mode M7. The driving mode M7 is a driving method of moving the first movable part 50 to the subject side and moving the second movable part 60 to the sensor 22 side. In the operation mode M7, it is possible to move the first and second movable parts 50 and 60 to a desired position, respectively by executing energization according to the driving patterns shown in FIG. 11.

FIG. 12 is a view explaining the driving patterns in the operation mode M8. The driving mode M8 is a driving method of moving the first and second movable parts 50 and 60 to the subject side. In the operation mode M8, it is possible to move the first and second movable parts 50 and 60 to a desired position, respectively by executing energization according to the driving patterns shown in FIG. 12.

As described above, in the image pick-up apparatus 10 according to the embodiment, even if the driving electrode substrate 42 and the holding electrode substrate 43 on the stationary part are commonly used, it is possible to simultaneously move the first and second movable parts 50 and 60 in the same direction or in an opposite direction. That is, since the two lenses can be moved simultaneously, the zoom magnification can be continuously varied at a constant speed, which provides the user with the smooth and natural impression of an output image on a screen.

Further, only one set of the stationary part is needed, the volume of an actuator unit is not increased and thus the size thereof is not increased. Further, since the electrodes are disposed in a manner entirely similar to a conventional manner, a driving force is not in short supply.

Further, since a cam mechanism and the like are not used, it is easy to adjust a focal point and to cope with a change of the focal point due to a change of temperature in an external environment which are required to a zoom lens unit. Accordingly, a degree of freedom is increased in the selection of a lens material and in the optical design of lenses.

Note that the present invention is by no means limited to the above embodiment. While the example described above has been explained as to the two movable parts, the zoom lens unit may include three movable parts. In addition, it goes without saying that various modifications can be made within the range which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A zoom lens unit for forming a subject image on an image pick-up device, comprising:
   a stationary part;
   first and second movable parts configured to reciprocate in predetermined directions guided by the stationary part, each movable part having held electrodes formed thereon and supporting a lens, at least one of the held electrodes configured to hold the movable part;

wherein the stationary part comprises:

a driving electrode substrate having a plurality of groups of driving electrodes formed thereon in a predetermined direction at a constant pitch to drive the first and second movable parts;

a holding electrode unit having a pair of holding electrodes corresponding to the held electrodes of the first and second movable parts to selectively attract and hold the first and second movable parts; and a drive control circuit for sequentially energizing the groups of the driving electrodes of the driving electrode substrate as well as for selectively energizing the holding electrodes of the holding electrode unit, wherein the drive control circuit executes a cycle at least once while at least one of the first and second movable parts moves one pitch of a driving electrode of the plurality of groups of driving electrodes when the first and second movable parts are moved in a different direction, wherein the cycle comprises:

a first operation for simultaneously grounding the held electrodes of the first movable part and the holding electrodes of the holding electrode unit corresponding to the held electrodes as well as attracting the first movable part to the driving electrode substrate by energizing at least one group of the driving electrodes of the plurality of groups of driving electrodes;

a second operation executed just after the first operation to energize ones of the holding electrodes and the held electrodes such that the first and second movable parts are attracted to the pair of holding electrodes of the holding electrode unit;

a third operation executed just after the second operation to simultaneously ground the held electrodes of the second movable part and the holding electrodes of the holding electrode unit corresponding to the held electrodes as well as to attract the second movable part to the driving electrode substrate by energizing at least one group of the driving electrodes of the plurality of groups of driving electrodes; and a fourth operation executed just after the third operation to energize ones of the holding electrodes and the held electrodes such that the first and second movable parts are attracted to the pair of holding electrodes of the holding electrode unit.

2. A zoom lens unit for forming a subject image on an image pick-up device, comprising:

a stationary part;

first and second movable parts configured to reciprocate in predetermined directions guided by the stationary part, each movable part having held electrodes formed thereon and supporting a lens, at least one of the held electrodes configured to hold the movable part;

wherein the stationary part comprises:

a driving electrode substrate having a plurality of groups of driving electrodes formed thereon in a predetermined direction at a constant pitch to drive the first and second movable parts;

a holding electrode unit having a pair of holding electrodes corresponding to the held electrodes of the first and second movable parts to selectively attract and hold the first and second movable parts; and a drive control circuit for sequentially energizing the groups of the driving electrodes of the driving electrode substrate as well as for selectively energizing the holding electrodes of the holding electrode unit, wherein the drive control circuit executes a cycle at least once while at least one of the first and second movable parts moves one pitch of a driving electrode of the plurality of groups of driving electrodes when the first and second movable parts are moved in a different direction, wherein the cycle comprises:

a first operation for simultaneously grounding the held electrodes of the first movable part and the holding electrodes of the holding electrode unit corresponding to the held electrodes as well as attracting the first movable part to the driving electrode substrate by energizing at least one group of the driving electrodes of the plurality of groups of driving electrodes;

a second operation executed just after the first operation to energize ones of the holding electrodes and the held electrodes such that the first and second movable parts are attracted to the pair of holding electrodes of the holding electrode unit;

a third operation executed just after the second operation to simultaneously ground the held electrodes of the first movable part and the holding electrodes of the holding electrode unit corresponding to the held electrodes as well as to attract the first movable part to the driving electrode substrate by energizing at least one group of the driving electrodes of the plurality of groups of driving electrodes; and a fourth operation executed just after the third operation to energize ones of the holding electrodes and the held electrodes such that the first and second movable parts are attracted to the pair of holding electrodes of the holding electrode unit.

3. A method of driving a zoom lens unit comprising:

a step of executing a cycle at least once while at least one of a first movable part and a second movable part moves one pitch of a driving electrode of a plurality of groups of driving electrodes, each movable part having held electrodes formed thereon, wherein the cycle comprises:

a first step for simultaneously grounding the held electrodes of the first movable part and holding electrodes of a holding electrode unit corresponding to the held electrodes as well as attracting the first movable part to a driving electrode substrate by energizing at least one group of the driving electrodes of the plurality of groups of driving electrodes;

a second step executed just after the first step to energize the holding electrodes and the held electrodes such that the first and second movable parts are attracted to a pair of holding electrodes of the holding electrode unit;

a third step executed just after the second step to simultaneously ground the held electrodes of the second movable part and the holding electrodes of the holding electrode unit corresponding to the held electrodes as well as to attract the second movable part to the driving electrode substrate by energizing at least one group of the driving electrodes of the plurality of groups of driving electrodes; and a fourth step executed just after the third step to energize ones of the holding electrodes and the held electrodes such that the first and second movable parts are attracted to the pair of holding electrodes of the holding electrode unit, wherein a stationary part, which causes the first and second movable parts each holding a lens to execute a zoom operation by guiding the first and second movable parts so as to reciprocate in a predetermined direction as well as by driving them in a different direction, comprises:

the driving electrode substrate having the plurality of groups of driving electrodes formed thereon in a predetermined direction at a constant pitch to drive the first and second movable parts; and the holding electrode unit having the pair of holding electrodes corresponding to the held electrodes of the first and second movable parts to selectively attract and hold the first and second movable parts.

4. A method of driving a zoom lens unit comprising:

a step of executing a cycle at least once while at least one of a first movable part and a second movable part moves one pitch of a driving electrode of a plurality of groups of driving electrodes, each movable part having held electrodes formed thereon, wherein the cycle comprises:

a first step for simultaneously grounding the held electrodes of the first movable part and holding electrodes of a holding electrode unit corresponding to the held electrodes as well as attracting the first movable part to a driving electrode substrate by energizing at least one group of the driving electrodes of the plurality of groups of driving electrodes;

a second step executed just after the first step to energize the holding electrodes and the held electrodes such that the first and second movable parts are attracted to a pair of holding electrodes of the holding electrode unit;

a third step executed just after the second step to simultaneously ground the held electrodes of the first movable part and the holding electrodes of the holding electrode unit corresponding to the held electrodes as well as to attract the first movable part to the driving electrode substrate by energizing at least one group of the driving electrodes of the plurality of groups of driving electrodes; and a fourth step executed just after the third step to energize ones of the holding electrodes and the held electrodes such that the first and second movable parts are attracted to the pair of holding electrodes of the holding electrode unit, wherein a stationary part, which causes the first and second movable parts each holding a lens to execute a zoom operation by guiding the first and second movable parts so as to reciprocate in a predetermined direction as well as by driving them in a different direction, comprises:

the driving electrode substrate having the plurality of groups of driving electrodes formed thereon in a predetermined direction at a constant pitch to drive the first and second movable parts; and the holding electrode unit having the pair of holding electrodes corresponding to the held electrodes of the first and second movable parts to selectively attract and hold the first and second movable parts.

* * * * *